United States Patent [19]

Torpey et al.

[11] Patent Number: 4,638,337

[45] Date of Patent: Jan. 20, 1987

[54] THERMAL INK JET PRINTHEAD

[75] Inventors: Peter A. Torpey, Rochester, N.Y.; Roger G. Markham, Webster, N.Y.

[73] Assignee: Xerox Corporation, Stamford, Conn.

[21] Appl. No.: 761,922

[22] Filed: Aug. 2, 1985

[51] Int. Cl.$^4$ ............ G01D 15/18

[52] U.S. Cl. ............ 346/140 R

[58] Field of Search ............ 346/140

[56] References Cited

U.S. PATENT DOCUMENTS

| | | | |
|---|---|---|---|
| 3,747,120 | 7/1973 | Stemme | 346/140 X |
| 4,275,290 | 6/1981 | Cielo et al. | 219/216 |
| 4,394,670 | 7/1983 | Sugitani | 346/140 |
| 4,438,191 | 3/1984 | Cloutier et al. | 430/140 R |
| 4,459,600 | 7/1984 | Sato | 346/140 |
| 4,463,359 | 7/1984 | Ayata et al. | 346/1.1 |
| 4,490,728 | 12/1984 | Vaught | 346/140 X |
| 4,535,343 | 8/1985 | Wright | 346/140 |
| 4,571,599 | 2/1986 | Rezanka | 346/140 |

*Primary Examiner*—Joseph W. Hartary

*Attorney, Agent, or Firm*—Robert A. Chittum

[57] ABSTRACT

An improved thermal ink jet printhead is disclosed for ejecting and propelling ink droplets on demand along a flight path toward a recording medium spaced therefrom in response to receipt of electrical input signals representing digitized data signals. Each printhead has one or more capillary filled ink channels. The channels have a droplet emitting nozzle on one end and connect to an ink supplying manifold on the other end. Each channel has a heating element upstream from the nozzle that is located in a recess. The heating elements are selectively addressable with a current pulse for substantially instantaneous vaporization of the ink contacting the addressed heating element to produce a bubble that expels a droplet of ink during its growth and collapse. The recess walls containing the heating elements prevent the lateral movement of the bubbles through the nozzle and therefore the sudden release of vaporized ink to the atmosphere, known as blowout which causes ingestion of air and interrupts the printhead operation.

3 Claims, 11 Drawing Figures

THERMAL INK JET PRINTHEAD

BACKGROUND OF THE INVENTION

1. Field of the Invention

This invention relates to thermal ink jet printing, and more particularly to an improved thermal ink jet printhead.

2. Description of the Prior Art

Generally, a drop-on-demand, ink jet printing system has a printhead that uses thermal energy to produce a vapor bubble in an ink-filled channel in order to expel a droplet. This type of printing is referred to as thermal ink jet printing or bubble ink jet printing and is the subject matter of the present invention. In existing thermal ink jet printing, the printhead comprises one or more ink filled channels, such as disclosed in U.S. Pat. No. 4,463,359 to Ayata et al, communicating with a relatively small ink supply chamber at one end and having an opening at the opposite end, referred to as a nozzle. A thermal energy generator, usually a resistor, is located in the channels near the nozzles a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a recording medium, such as paper.

The printhead of U.S. Pat. No. 4,463,359 has one or more ink-filled channels which are replenished by capillary action. A meniscus is formed at each nozzle to prevent ink from weeping therefrom. A resistor or heater is located in each channel upstream from the nozzles. Current pulses representative of data signals are applied to the resistors to momentarily vaporize the ink in contact therewith and form a bubble for each current pulse. Ink droplets are expelled from each nozzle by the growth of the bubbles which causes a quantity of ink to bulge from the nozzle and break off into a droplet at the beginning of the bubble collapse. The current pulses are shaped to prevent the meniscus from breaking up and receding too far into the channels, after each droplet is expelled. Various embodiments of linear arrays of thermal ink jet devices are shown such as those having staggered linear arrays attached to the top and bottom of a heat sinking substrate and thoe having different colored inks for multicolored printing. In one embodiment, a resistor is located in the center of a relatively short channel having nozzles at both ends thereof. Another passageway is connected to the open-ended channel and is perpendicular thereto to form a T-shaped structure. Ink is replenished to the open-ended channel from passageway by capillary action. Thus, when a bubble is formed in the open-ended channel, two different recording mediums may be printed simultaneously.

U.S. Pat. No. 4,275,290 to Cielo et al discloses a thermally activated liquid ink printing head having a plurality of orifices in a horizontal wall of an ink reservoir. In operation, an electric current pulse heats selected resistors that surround each orifice and vaporizes the non-conductive ink. The vapor condenses on a recording medium, such as paper, spaced above and parallel to the reservoir wall, causing a dark or colored spot representative of a picture element or pixel. Alternatively, the ink may be forced above the orifice by partial vaporization of the ink, so that the ink is transported by a pressure force provided by vapor bubbles. Instead of partially or completely vaporizing the ink, it can be caused to flow out of the orifices by reduction of the surface tension of the ink. By heating the ink in the orifices, the surface tension coefficient decreases and the meniscus curvature increases, eventually reaching the paper surface and printing a spot. A vibrator can be mounted in the reservoir to apply a fluctuating pressure to the ink. The current pulse to the resistors are coincident with the maximum pressure produced by the vibration.

U.S. Pat. No. 4,438,191 to Cloutier et al discloses a method of making a monolithic bubble-driven ink jet printhead which eliminates the need for using adhesives to construct multiple part assemblies. The method provides a layered structure which can be manufactured by standard integrated circuit and printed circuit processing techniques. Basically, the substrate with the bubble generating resistors and individually addressing electrodes have the ink chambers and nozzles integrally formed thereon by standard semiconductor processing.

U.S. Ser. No. 719,410, now U.S. Pat. No. 4,601,777, to Hawkins filed Apr. 3, 1985 and assigned to the same assignee as this case, discloses a thermal ink jet printhead and method of fabrication. In this case, a plurality of printheads may be concurrently fabricated by forming a plurality of sets of heating elements with their individual addressing electrodes on one silicon wafer and etching corresponding sets of grooves which may serve as ink channels with a common reservoir in another silicon wafer. The two wafers are aligned and bonded together, so that each channel has a heating element and then the individual printheads are obtained by milling away the unwanted silicon material to expose the addressing electrode terminals and then dicing the wafer into separate printheads.

In all bubble jet or thermal printheads, it is important to be able to keep the ink droplet velocities relatively high and to impart a large momentum to the ejected droplet. This is so, for example, to minimize misdirectionality of the droplet caused by wetting effects at the channel orifices or nozzles and to help overcome first droplet ejection problems in order to assure stable, uniform printing. High droplet velocities and large impulses may be attained by placing the heating element nearer the orifice, so that only a small amount of ink is acted upon the bubble growth and collapse and/or by increasing the heating element current pulse duration to generate more thermal energy, thereby increasing the amount of stored heat in the ink prior to nucleation of the micro-sized vapor bubbles which will lead to a more rapid or explosive bubble growth.

However, in the typical bubble jet printhead discussed above and shown in FIG. 3*a*, application of one or both of these methods is very limited due to the phenomenon referred to as "blowout." "Blowout" is the mechanism by which a growing bubble within a printhead channel can expand so far as to push out past the channel orifice and release some of the vaporized ink. This occurrence can lead to the ingestion of air into the channel and the possibility of a large trapped air bubble over the heating element surface, as well as a misdirected, weakly propelled droplet. Any trapped air bubble will seriously affect the nucleation process in the ink over the heating elment's surface, as is well known in the art, and cause subsequent misfirings from that channel. This blowout of the growing bubble is due to the lateral spreading of the bubble as it grows. Therefore, placement of the heating element closer to the orifice and/or increasing the heating pulse duration make blowout more likely. Thus, prior art devices accept the lower droplet speeds from less explosive bubble growth to avoid the blowout phenomenon.

SUMMARY OF THE INVENTION

It is an object of the present invention to provide an improved ink jet printhead for high resolution printing that is more operationally efficient.

It is another object of this invention to provide an improved thermal ink jet printhead which prevents the blowout of vaporized ink from the bubble produced therein to expel a droplet therefrom.

It is still another object of this invention to provide an improved thermal ink jet printhead capable of increased heating element pulse durations to overcome first droplet problems and to produce higher velocity for the emitted droplets.

It is yet another object of this invention to enable placement of the heating elements closer to the printhead nozzles thereby providing further means for keeping the velocities of the emitted droplets high.

It is still a further object of this invention to provide an improved printhead capable of increased operating droplet emitting frequencies, since the increased duty cycles per heating element leading to an increase in the operational temperature of the ink caused thereby are not as likely to produce vapor blowout.

It is an additional object of the invention to provide a printhead having each of the bubble generating heating elements positioned at the bottom of a recess in the channels, the recesses being located a predetermined distance upstream of the channel nozzles.

In the present invention, each bubble generating heating element of the improved thermal ink jet printhead is placed in the bottom of a recess of predetermined depth in one wall of each channel a predetermined distance upstream of the channel nozzles, so that the sides of the vapor bubbles produced are constrained by the recess walls from moving along the ink flow path and out of the nozzle and instead made to grow in a direction normal to the recess bottom. Such an arrangement avoids the occurrence of vapor blowout as experienced by prior art devices when improved performance is sought from the prior art printheads.

In fact, the latitudes for the heating element pulse duration and the heating element placement in the channel relative to the channel nozzle are both increased when the recessed heating element concept is used. Thus, longer heating element pulses may be applied, and the heating element may be closer to the nozzle before blowout of vapor occurs and becomes a problem.

DESCRIPTION OF THE PREFERRED EMBODIMENT

Figure 1:
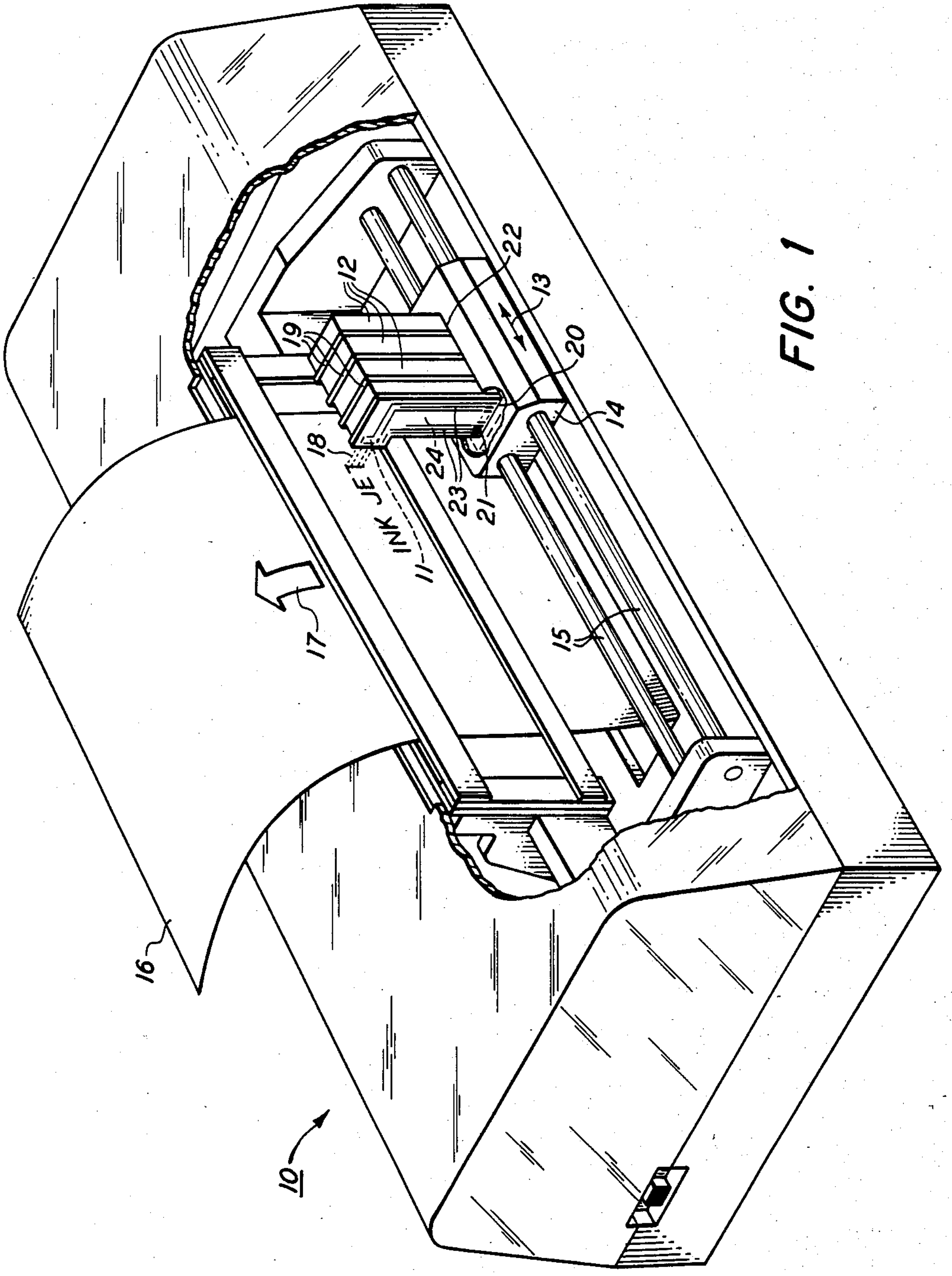
FIG. 1 is a schematic isometric view of a carriage type thermal ink jet printing system incorporating the present invention.

A typical carriage type, multicolor, thermal ink jet printing device 10 is shown in FIG. 1. A linear array of ink droplet producing channels is housed in each printhead 11 of each ink supply cartridge 12 which may optionally be disposable. One or more ink supply cartridges are replaceably mounted on a reciprocating carriage assembly 14 which reciprocates back and forth in the direction of arrow 13 on guide rails 15. The channels terminate with orifices or nozzles aligned perpendicular to the carriage reciprocating direction and parallel to the stepping direction of the recording medium 16, such as paper. Thus, the printhead prints a swath of information on the stationary recording medium as it moves in one direction. Prior to the carriage and printhead reversing direction, the recording medium is stepped by the printing device a distance equal to the printed swath in the direction of arrow 17 and then the printhead moves in the opposite direction printing another swath of information. Droplets 18 are expelled and propelled to the recording medium from the nozzles in response to digital data signals received by the printing device controller (not shown), which in turn selectively addresses the individual heating elements, located in the printhead channels a predetermined distance from the nozzles, with a current pulse. The current pulses passing through the printhead heating elements vaporize the ink contacting the heating elements and produce temporary vapor bubbles to expel droplets of ink from the nozzles. Alternatively, several printheads may be accurately juxtapositioned to form a pagewidth array of nozzles. In this configuration (not shown), the nozzles are stationary and the paper moves therepast.

In FIG. 1, several ink supply cartridges 12 and fixedly mounted electrode boards or daughter boards 19 are shown in which each sandwich therebetween a printhead 11, shown in dashed line. The printhead is permanently attached to the daughter board and their respective electrodes are wire-bonded together. A printhead fill hole, discussed more fully later, is sealingly positioned against and coincident with an aperture (not shown) in the cartridge, so that ink from the cartridge is continuously supplied to the ink channels via the manifold during operation of the printing device. This cartridge is similar to and more fully described in U.S. application Ser. No. 677,426 now U.S. Pat. No. 4,571,599 filed Dec. 3, 1984 by Ivan Rezanka and assigned to the same assignee as this application. Note that the lower portion 20 of each daughter board 19 has electrode terminals 21 which extend below the cartridge bottom 22 to facilitate plugging into a female receptacle (not shown) in the carriage assembly 14. In the preferred embodiment, the printhead contains 48 channels on about 3 mil centers (75 microns) for printing with a resolution of 300 spots per inch (spi). Such a high density of addressing electrodes 23 on each daughter board is more conveniently handled by having some of the electrodes terminate on both sides. In FIG. 1, the side 24 shown is opposite the one containing the printhead. The electrodes all originate on the side with the printhead, but some pass through the daughter board. All of the electrodes 23 terminate at daughter board end 20.

Figure 2:
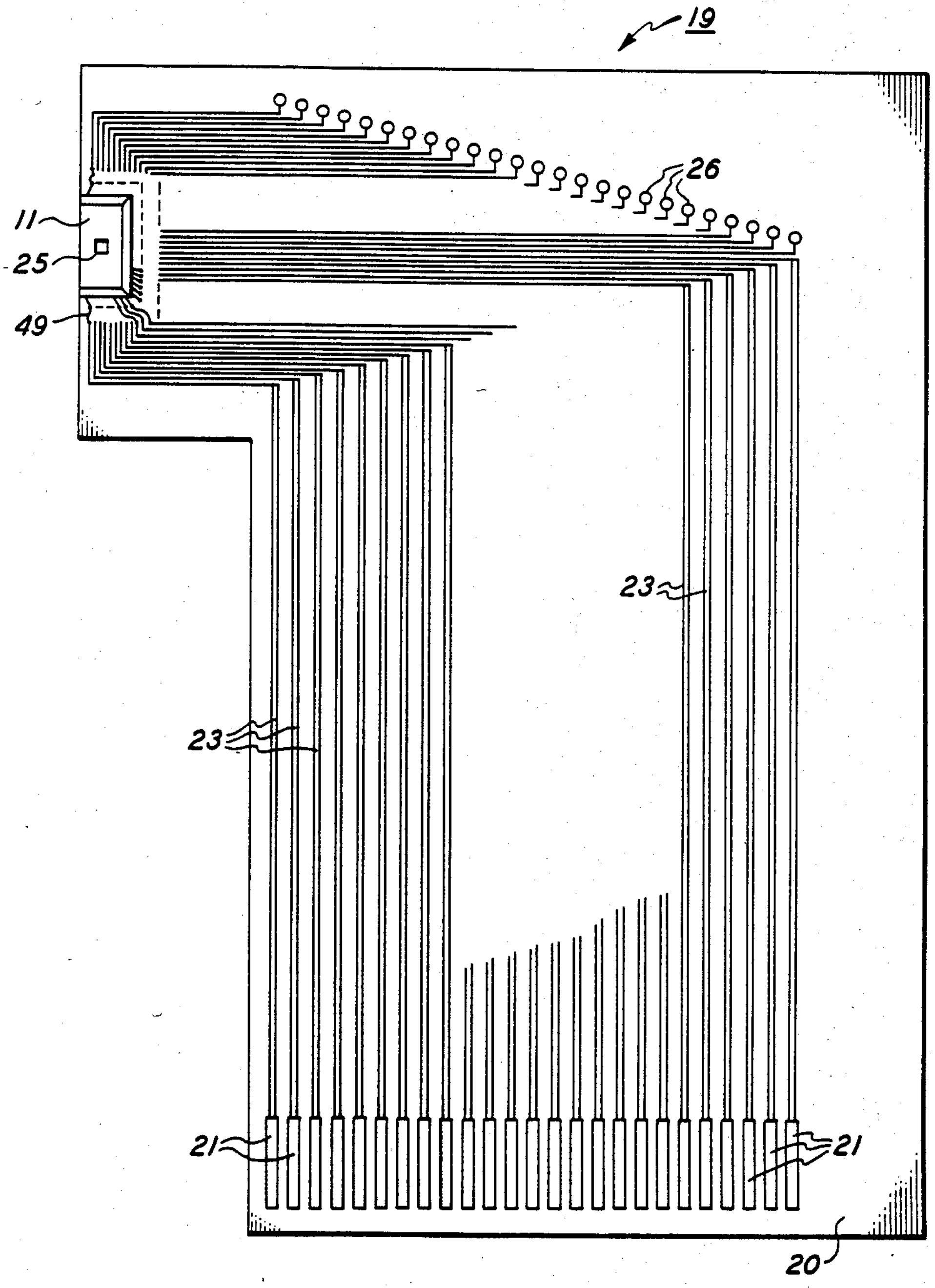
FIG. 2 is a plan view of the daughter board and fixedly mounted printhead showing the terminals of the printhead electrodes wire-bonded electrodes to one end of the electrodes of the daughter board.

A plan view of the L-shaped daughter board 19 is shown in FIG. 2. This view is of the side containing the printhead 11. The daughter board electrodes 23 are on a one-to-one ratio with the electrodes of the printhead and are connected thereto by wire bonds 49. The printhead fill hole 25 is readily apparent in this FIG. 2. About half of the daughter board electrodes 23, which are on the longer leg of the daughter board, are on the opposite surface thereof, so that both sides of the daughter board end portion 20 have substantially identical parallel arrays of terminals 21. The electrodes on the opposite side of the daughter board are electrically connected through the daughter board at locations 26.

Figure 4:
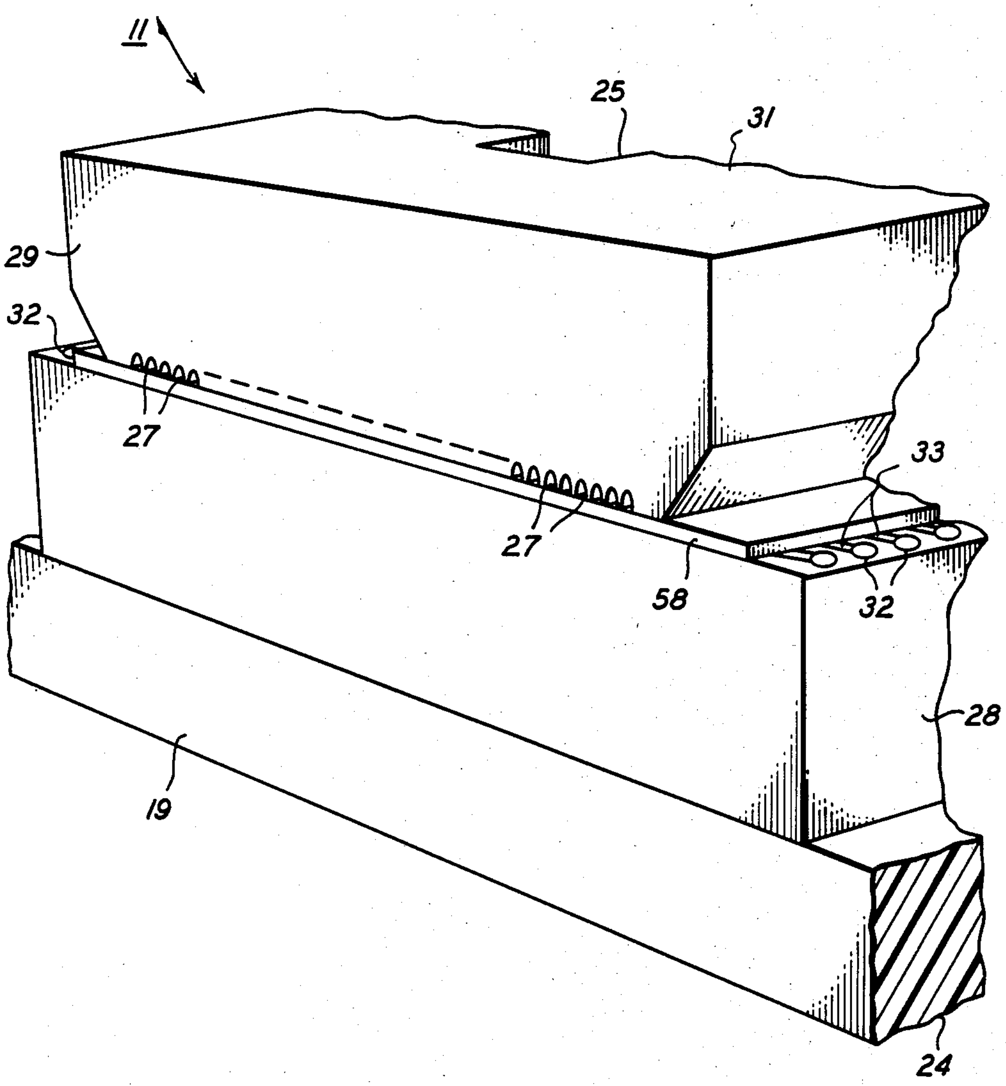
FIG. 4 is an enlarged schematic isometric view of a printhead mounted on the daughter board showing the ink droplet emitting nozzles.

FIG. 4 is an enlarged schematic isometric view of the front face of the printhead 11 showing the array of droplet emitting nozzles 27. The lower electrically insulating substrate or heating element plate 28 has the heating elements (not shown) and addressing electrodes 33 patterned on the surface 30 thereof, while the upper substrate 31 has parallel grooves which extend in one direction and penetrate through the upper substrate front edge 29. The other end of the grooves communicate with a common internal recess 45, not shown in this Figure. The floor 45*a* (see FIGS. 6 and 9) of the internal recess has an opening therethrough for use an an ink fill hole 25. The surface of the upper substrate with the grooves are aligned and bonded to the lower substrate 28 as described later, so that a respective one of the plurality of heating elements is positioned in each channel, formed by the grooves and the lower substrate. Ink enters the manifold formed by the recess 45 and the lower substrate 28 through the fill hole 25 and, by capillary action, fills the channels. The ink at each nozzle forms a meniscus, the surface tension of which prevents the ink from weeping therefrom. The addressing electrodes 33 on the lower substrate 28 terminate at terminals 32. The upper substrate or channel plate 31 is smaller than that of the lower substrate or heating element plate 28 in order that the electrode terminals 32 are exposed and available for wire-bonding to the electrodes of the daughter boards, on which this printhead 11 is permanently mounted. Layer 58 is a thick-film passivation layer, discussed later, sandwiched between upper and lower substrates. This layer is etched to expose the heating elements, thus placing them in a recess or pit for reasons explained later.

Figure 3A:
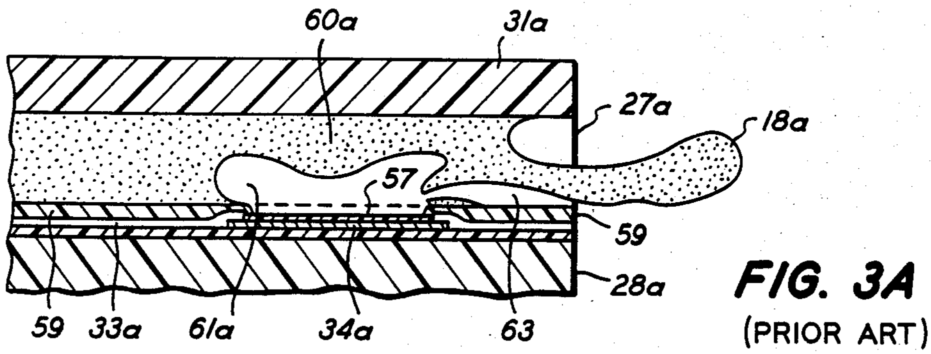
FIG. 3A (PRIOR ART)
FIG. 3*a* is an enlarged schematic cross-sectional side view of a prior art printhead channel depicting the occurrence of a vapor blowout.
Figure 3B:
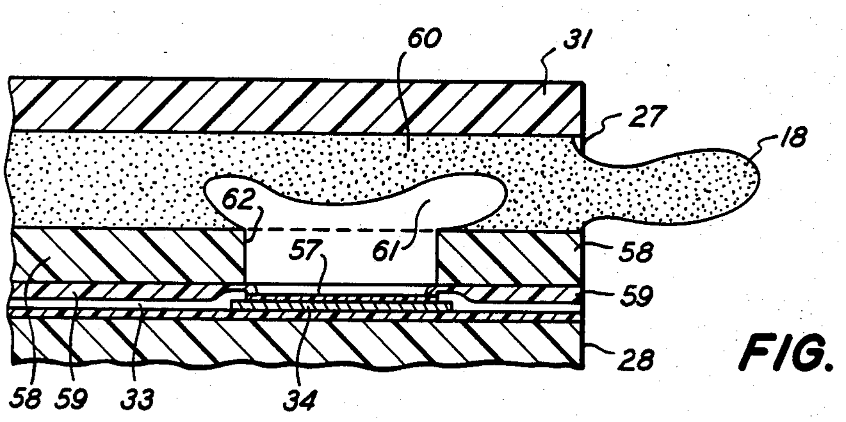
FIG. 3*b* is an enlarged schematic cross-sectional side view of a printhead channel showing the recessed heating element of the present invention preventing vapor blowout.

A cross-sectional view along the length of a one of the channels of the printhead in FIG. 4 is shown in FIG. 3*b* at a time when the heating element 34 has been addressed with a current pulse to vaporize the ink 60 contacting the surface of the heating element and to form a bubble 61. The bubble causes the ink to bulge from the nozzle 27, producing a droplet 18 that is seen just prior to its breaking away as a discrete droplet. The recess walls 62 of layer 58 restrict the spread of the vapor bubble and makes it grow in a direction normal to the surface of the heating element.

In contrast, the prior art devices have the heating elements substantially level with the channel floors or even slightly above it. A cross-sectional view of a prior art device is shown in FIG. 3*a*. Like index numerals are used for the components that are identical to those of the present invention, but a subscript "a" is added to distinguish the prior art components from those of the subject invention of FIG. 3*b*. Without lateral restriction, the vapor bubble periodically releases vapor along with the droplet 18*a* commonly referred to as "blow-out" 63. Accordingly, prior art devices generally place their heating element further upstream of the nozzle and/or decreases the heating element pulse duration. This, of course, results in less efficient ink jet printing.

Figure 5A:
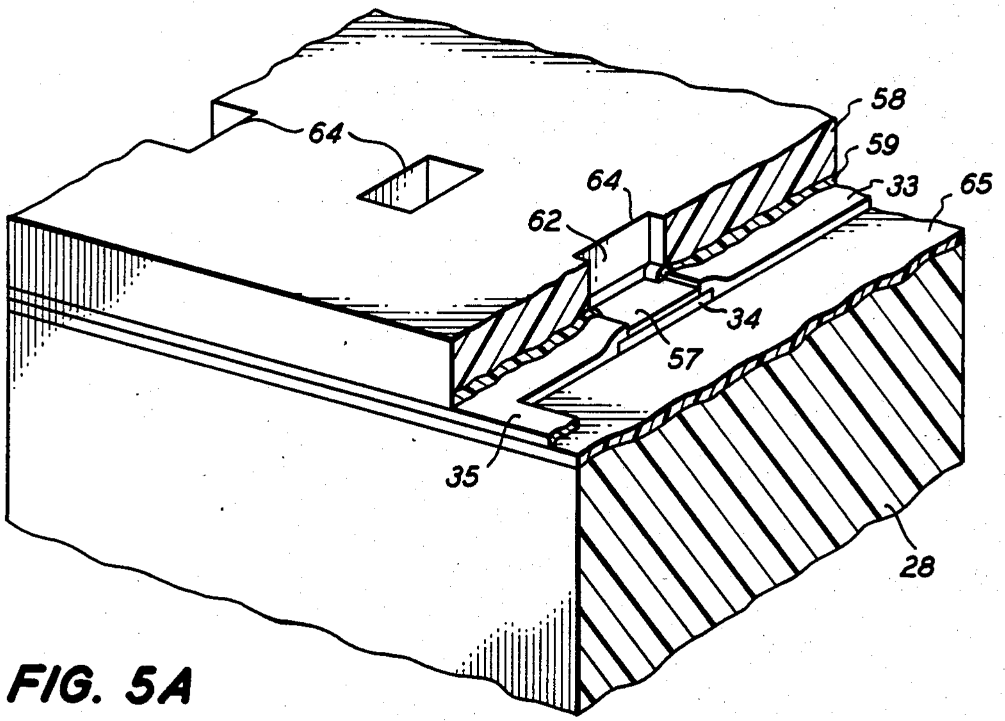
FIG. 5*a* is an enlarged partially shown isometric view of the heating element plate, partially sectioned to show the recessed heating elements.
Figure 5:
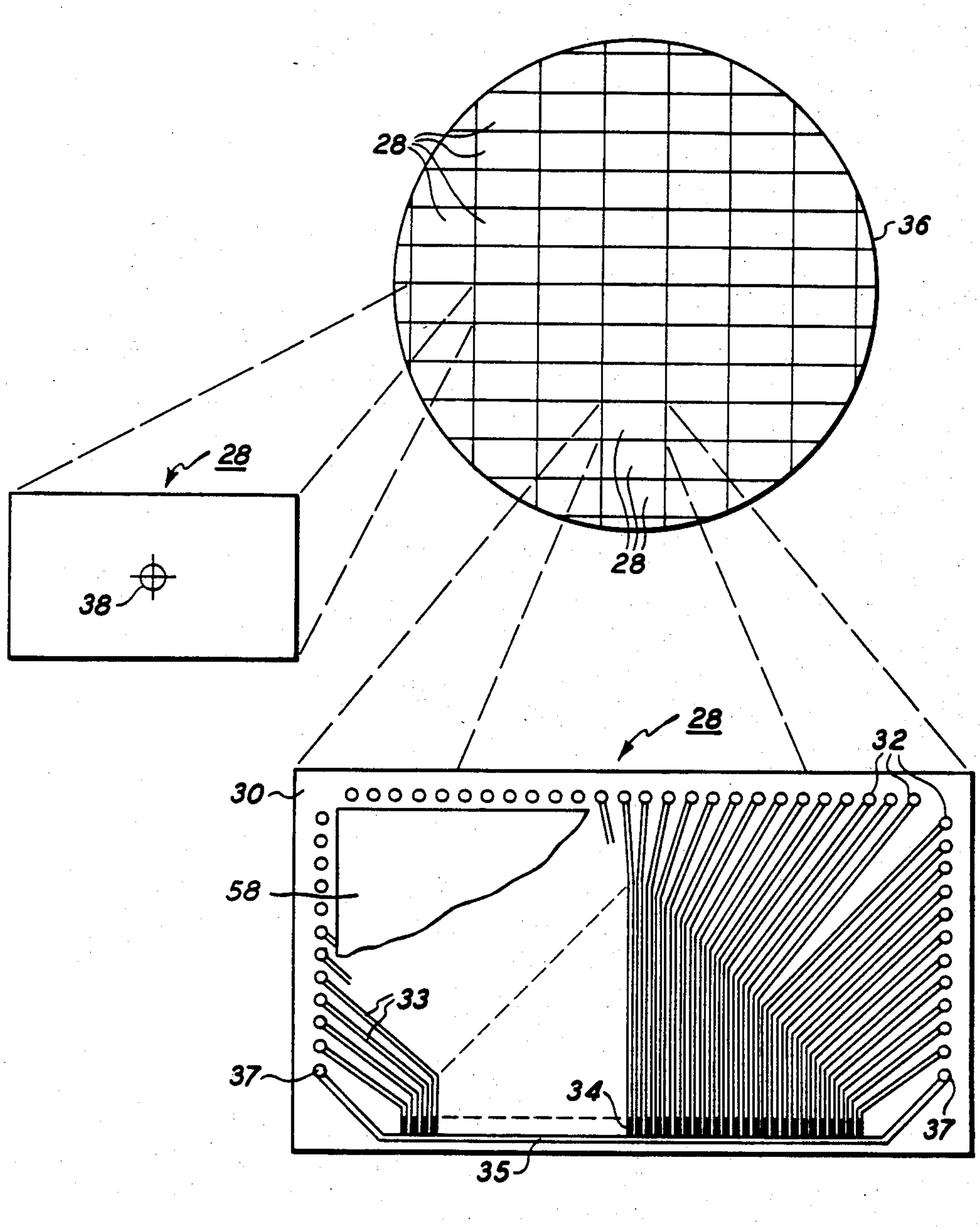
FIG. 5 is schematic plan view of a wafer having a plurality of heating element arrays and addressing electrodes, with one heating element array and one alignment mark being shown enlarged.

In FIG. 5, a plurality of sets of bubble-generating, heating elements 34 and their addressing electrodes 33 are patterned on the polished surface of a single-side-polished, (100) silicon wafer 36. One set of heating elements 34 and addressing electrodes 33 suitable for one ink jet printhead is enlarged. Prior to patterning the multiple sets of printhead electrodes 33, the resistive material that serves as the heating elements, and the common return 35, the polished surface of the wafer is coated with an underglaze layer 65 (see FIG. 5*a*), such as $SiO_2$, having a thickness of about two microns. The resistive material may be a doped polycrystalline silicon which may be deposited by chemical vapor deposition (CVD) or any other well known resistive material such as $ZrB_2$. The common return and the addressing electrodes are typically aluminum leads deposited on the underglaze layer and over the edges of the heating elements. The common return ends or terminals 37 and addressing electrodes terminals 32 are positioned at predetermined locations to allow clearance for wire-bonding to the daughter board electrodes 23 after the channel plate 31 (see FIG. 10) is attached to make the printhead. The common return 35 and the addressing electrodes 33 are deposited to a thickness of 0.5 to 3.0 microns, with the preferred thickness being 1.5 microns.

In the preferred embodiment, polysilicon heating elements are used and a $SiO_2$ thermal oxide layer 57 is grown from the polysilicon in high temperature steam. The thermal oxide layer is typically grown to a thickness of 0.5 to 1.0 micron to protect and insulate the heating elements from the conductive ink. The thermal oxide is removed at the edges of the polysilicon heating elements for attachment of the addressing electrodes and common return, which are then patterned and deposited. If a resistive material such as $ZrB_2$ is used for the heating elements, then other suitable well known insulative materials may be used for the protective layer thereover.

Before electrode passivation, a tantalum (Ta) layer (not shown) may be optionally deposited to a thickness of about 1 micron on the heating element protective layer 57 for added protection thereof against the cavitational forces generated by the collapsing ink vapor bubbles during printhead operation. The Ta layer is etched off all but the protective layer 57 directly over the heating elements using, for example $Cf_4/O_2$ plasma etching.

For electrode passivation, a 2 micron thick phosphorus doped CVD $SiO_2$ film 59 (see FIG. 3*b*) is deposited over the entire wafer surface, including the plurality of sets of heating elements and addressing electrodes. The passivation film or layer 59 is etched off of the terminal ends of the common return and addressing electrodes for wire bonding later with the daughter board electrodes. This etching of the $SiO_2$ film may be by either the wet or dry etching method. Alternatively, the electrode passivation may be accomplished by plasma deposited $Si_3N_4$.

Next, a thick film type insulative layer 58 such as, for example, Riston ® is formed on the passivation layer 59 having a thickness of between 10 and 100 microns and preferably in the range of 25 to 50 microns. The insulative layer 58 is photolithographically processed to enable etching and removal of those portions of layer 58 over each heating element (forming recesses 64), and over each electrode terminal 32, 37.

In FIG. 5*a*, an enlarged, partially sectioned isometric view of the heating element plate 28 is shown. Part of the electrode passivation layer 59 and the overlaying, relatively thick, insulating layer 58 (preferably Riston ® or equivalent) is removed from a portion of one addressing electrode for ease of understanding the heating element plate construction. Each layer 58 is photolithographically patterned and etched to remove it from each heating element 34 and its protective layer 57 and to remove it from the electrode terminals 32, 37, so that a recess or pit 64 is formed having walls 62 that exposes each heating element. The recess walls 62 inhibit lateral movement of each bubble generated by the pulsed heating element, which lie at the bottom of the recesses 64, and thus promote bubble growth in a direction normal thereto. Therefore, the blowout phenomonon of releasing a burst of vaporized ink is avoided.

The passivated addressing electrodes are exposed to ink along the majority of their length and any pin-hole in the normal electrode passivation layer 59 exposes the electrode to electrolysis which would eventually lead to operational failure of the heating element addressed thereby. Accordingly, an added protection of the addressing electrodes is obtained from the thick film layer 58, since the electrodes are passivated by two overlapping layers, normal layer 59 and the thick film layer 58.

In addition to opening a recess in the thick film layer 58 over the heating elements and cleaning the thick film layer from the electrode terminals 32, 37, the alignment markings 38 discussed later are cleared of layer 58, as well as being cleared of passivation layer 59. Two or more alignment markings 38 are photolithographically produced at predetermined locations on separate lower substrates 28, which substrates are produced from wafer 36. These alignment markings are used for alignment of the plurality of upper substrates 31 having the channels that are produced from wafer 39. The surface of the single-sided wafer 36 containing the plurality of sets of the heating elements and addressing electrodes are bonded to the wafer 39 after alignment between the wafers, as explained later.

Figure 6:
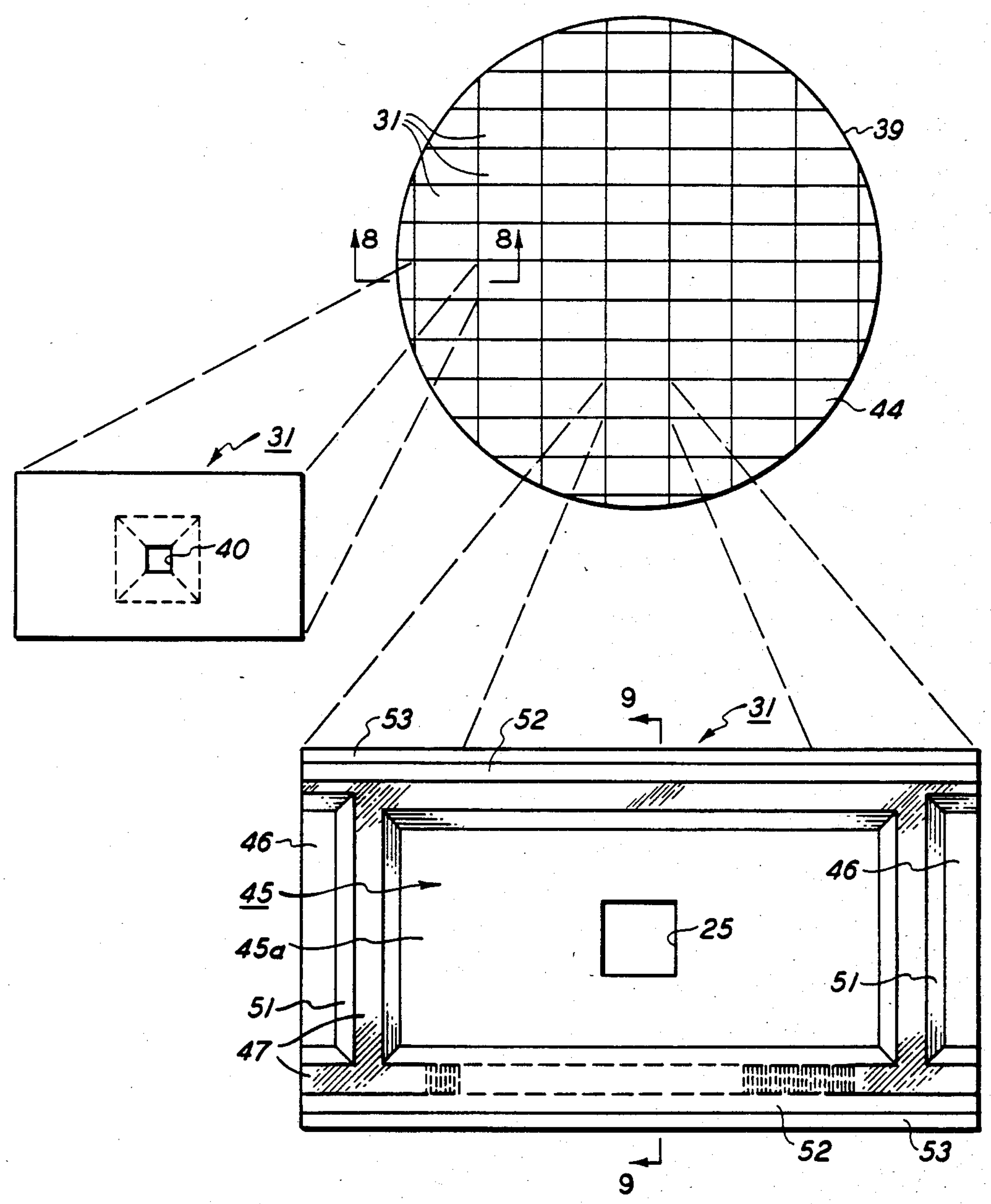
FIG. 6 is a schematic plan view of a wafer having a plurality of ink manifold recesses, with one manifold recess and one alignment opening being shown enlarged.
Figure 8:
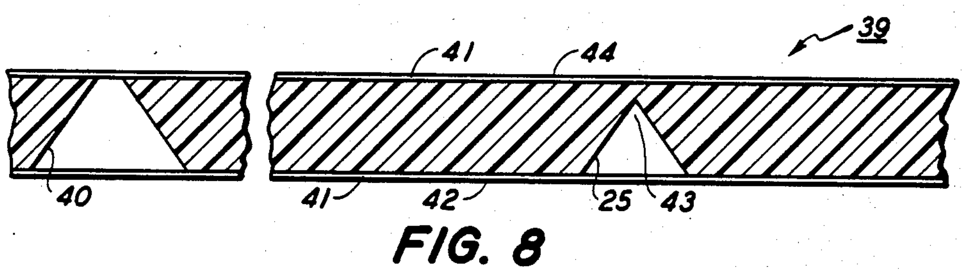
FIG. 8 is an enlarged cross-sectional view of the wafer of FIG. 6 as viewed along the line "8—8" thereof, showing an alignment opening and a recess which will later form the fill hole.

In FIG. 6, a two-side-polished, (100) silicon wafer 39 may be used, for example, to produce the plurality of upper substrates 31 for the printhead. After the wafer is chemically cleaned, a pyrolytic CVD silicon nitride layer 41 (see FIG. 8) is deposited on both sides. Using conventional photolithography, a via for fill hole 25 for each of the plurality of upper substrates 31 and, at least two vias for alignment openings 40 at predetermined locations are printed on one wafer side 42, opposite the side shown in FIG. 6. The silicon nitride is plasma etched off of the patterned vias representing the fill holes and alignment openings. As in the printhead fabrication process discussed in co-pending application Ser. No. 719,410, referred to earlier in the background section, a potassium hydroxide (KOH) anisotropic etch may be used to etch the fill holes and alignment openings. In this case, the {111} planes of the (100) wafer make an angle of 54.7 degrees with the surface of the wafer. The fill holes are small square surface patterns of about 20 mils (0.5 mm) per side, and the alignment openings are about 60 to 80 mils (1.5 to 2 mm) square. Thus, the alignment openings are etched entirely through the 20 (0.5 mm) mil thick wafer, while the fill holes are etched to a terminating apex 43 at about half way to three quarters through the wafer (see FIG. 8). The relatively small square fill hole is invariant to further size increase with continued etching, so that etching of the alignment openings and fill holes are not significantly time constrained. This etching takes about two hours and many wafers can be simultaneously processed.

Next, the opposite side 44 of wafer 39 is photolithographically patterned, using the previously etched alignment holes as a reference, to form the relatively large rectangular recesses 45 that will eventually become the ink manifolds of the printheads. Also patterned are two recesses 46 between the manifolds in each substrate 31 and adjacent each of the shorter walls 51 of the manifold recesses. Parallel elongated grooves 53, which are parallel and adjacent each longer manifold recess wall 52, extend entirely across the wafer surface 44 and between the manifold recesses of adjacent substrates 31. The elongated grooves do not extend to the edge of the wafer for reasons explained later. The tops 47 of the walls delineating the manifold recesses are portions of the original wafer surface 44 that still contain the silicon nitride layer and forms the streets 47 on which adhesive will be applied later for bonding the two wafers 36, 39 together. The elongated grooves 53 and recesses 46 provide clearance for the printhead electrode terminals during the bonding process discussed later. One of the manifold recess walls 52 of each manifold will later contain channel grooves 48 which will serve as ink channels as discussed with reference to FIG. 7. At this stage in the fabrication process, the grooves 48 have not yet been formed, so that they are shown in dashed line in FIG. 6 on top of one of the longer manifold recess walls 52 to assist in understanding where the future channels will be produced. A KOH solution anisotropic etch is used to produce the recess, but, because of the size of the surface pattern, the etching process must be timed to stop the depth of the recesses. Otherwise, the pattern size is so large that the etchant would etch entirely through the wafer. The floor 45*a* of the manifold recess 45 is determined at a depth where the etching process is stopped. This floor 45*a* is low enough to meet or slightly surpass the depth of the fill hole apex 43, so that an opening is produced that is suitable for use as the ink fill hole 25.

Figure 7:
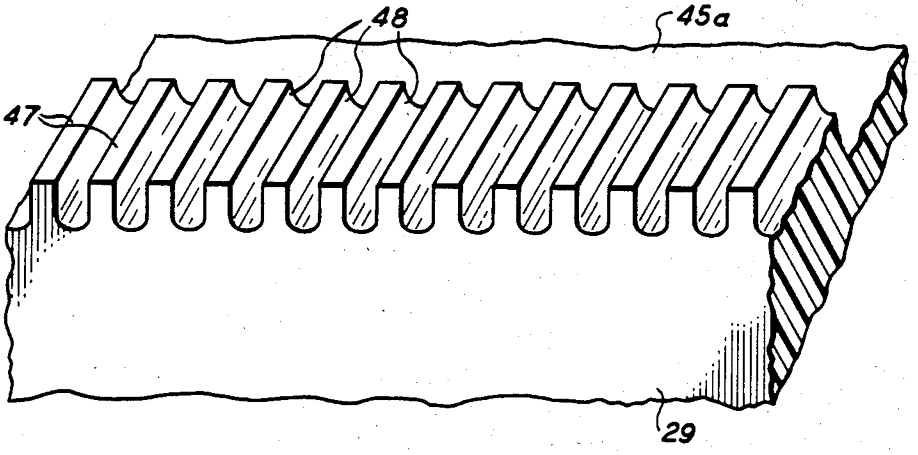
FIG. 7 is an enlarged isometric view of one set of channels which were later diced into one of the manifold recess walls of FIG. 6.

Parallel grooves 48 are milled into a predetermined recess wall 52 by any dicing machine as is well known in the art. Each groove 48 shown in FIG. 7 is about 20 mils (0.5 mm) long and has a depth and width of about 1 mil (25 microns). The lineal spacing between axial centerlines of the grooves are about 3 mils (75 microns). The silicon nitride layer 41 on wafer side 44 forms the bonding surfaces, as discussed earlier, and a coating of an adhesive, such as a thermosetting epoxy, is applied in a manner such that it does not run or spread into the grooves 48 or other recesses.

Figure 10:
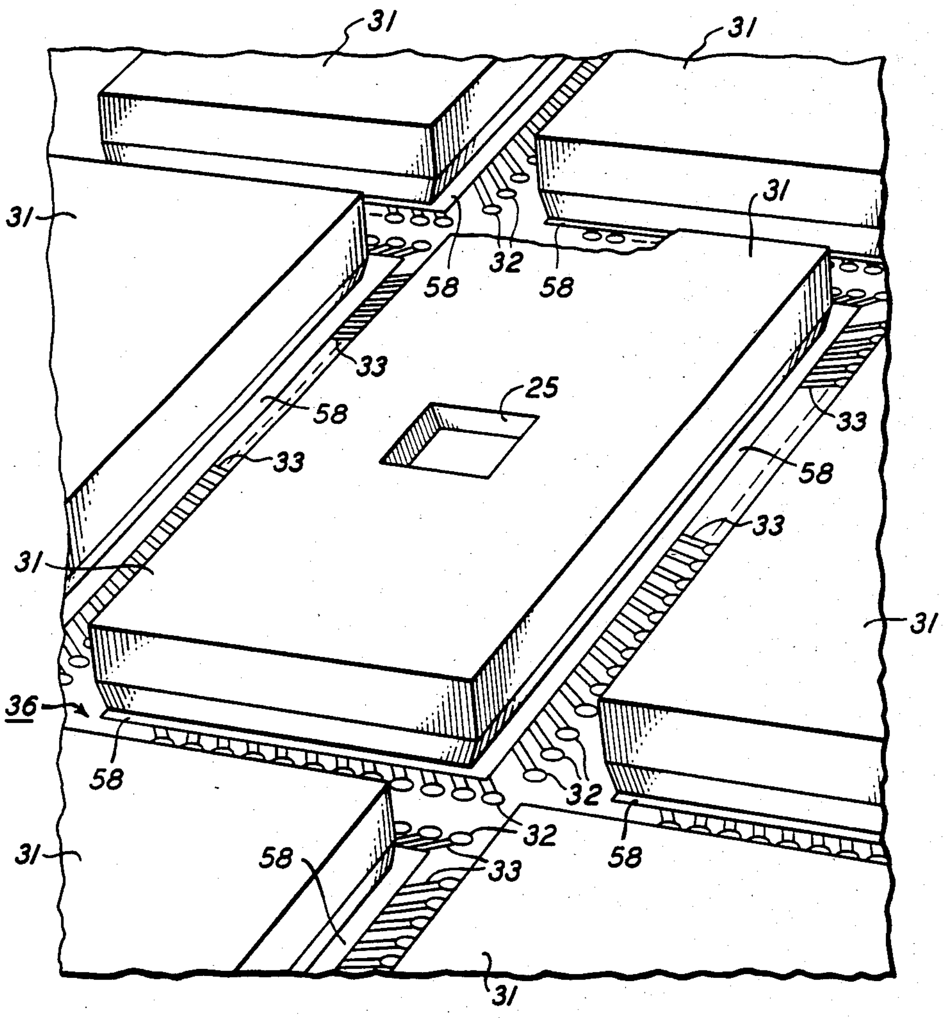
FIG. 10 shows an enlarged isometric view of the channel and manifold wafer bonded to the wafer with the heating elements after the excess channel wafer material has been removed.

The alignment openings 40 are used, for example, with a vacuum chuck mask aligner to align the channel wafer 39 via the alignment marks 38 on the heating element and addressing electrode wafer 36. The two wafers are accurately mated and tacked together by partial curing of the adhesive. Alternatively, the heating element and channel wafers 36, 39 can be given precisely diced edges and then manually or automatically aligned in a precision jig. The grooves 48 automatically are positioned by either alignment operation, so that each one has a heating element therein located a predetermined distance from the nozzles or orifices in channel plate edge 29 (see FIG. 4). The two wafers are cured in an oven or a laminator to permanently bond them together and then the channel wafer is milled to produce individual upper substrates with the manifolds and ink channels as shown in FIG. 10. Care is taken not to machine the exposed printhead common return terminals 37 or addressing electrodes terminals 32 which surround the three sides of the manifold that do not have the nozzles. The recesses 46 and elongated grooves 53 greatly assist in preventing damage to the printhead electrodes 33 and terminals 32 by spacing the upper substrate therefrom.

Figure 9:
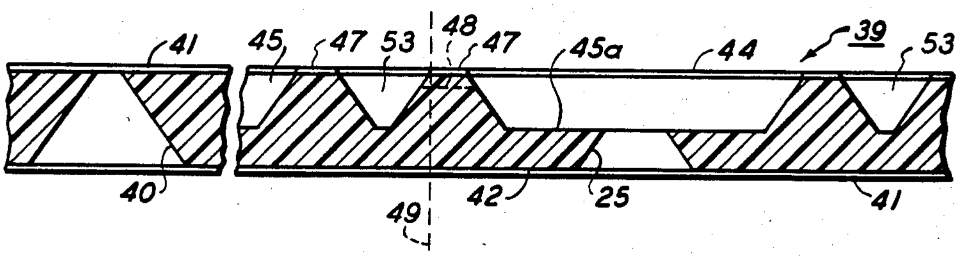
FIG. 9 is a cross-sectional view of the enlarged manifold recess of FIG. 6 as viewed along line "9—9" thereof.

The heating element wafer 36 is then diced to produce a plurality of individual printheads which are bonded to the daughter board and the printhead electrode terminals are wire bonded to the daughter board electrodes. A dicing cut made perpendicular to and through the channels produces the edge face 29. In FIG. 9, which is a cross-sectional view taken along line "9—9" in FIG. 6, the plane 49 is shown in dashed line to indicate where the dicing machine cuts to produce the nozzle-bearing face 29.

In recapitulation, several advantages are obtained by recessing the heating elements in a thermal ink jet printhead. First and foremost is that the possibility of blowout is greatly reduced. Next, the latitude for heating element energization is increased by enabling longer duration for the heating element activations. Therefore, longer heating pulses giving larger impulses to the ejected ink are possible in order to overcome first droplet problems and to produce droplets of higher velocity. The heating elements themselves may be located closer to the orifice, thereby further keeping the droplet velocities high. Also, higher operating frequencies are allowed, since increased duty cycles leading to an increase in the operating temperature of the ink are not as likely to produce a blowout. Finally, the thick-film passivation layer used to produce the recesses or pits for the heating elements provide increased protection for the addressing electrodes from the ink. A single pin hole in the electrode passivation layer that exposes an electrode to the ink will affect and/or shorten the operating life of the heating element addressed thereby.

The exact geometry and location of the heating element recess depends on the droplet size and velocity desired. In general, the recess containing the heating element should be just deep enough so that it will contain most of the bubble at the bubble's maximum size or displacement, but not so deep as to decrease the droplet velocity dramatically. The heating element recess can be located as close to the orifice as desired consistant with manufacturing limitations and the occurrence of blowout. The cross-sectional area of the heating element recess can be varied to obtain the desired droplet size or volume. In the preferred embodiment, the heating element recess is spaced about 2 to 3 mil (50–75 microns) upstream from the orifice and is between 1 to 2 mils (25 to 50 microns) deep, with a heating element surface area of about 2 mil×4 mil.

Many modifications and variations are apparent from the foregoing description of the invention and all such modifications and variations are intended to be within the scope of the present invention.

We claim:

1. A thermal ink jet printhead for ejecting and propelling ink droplets on demand therefrom along a flight path from orifices in the printhead toward a recording medium spaced therefrom by momentarily heating ink located in straight capillary channels within the printhead that interconnect respective ones of the orifices with an ink supplying reservoir also within the printhead, the channels and orifices having substantially equal cross-sectional areas, thus forming a straight ink flow path therebetween to produce temporary vapor bubbles in the channels, the heating of the ink being in response to electrical input signals representing digitized signals selectively applied to individual heating elements located one each in the channels adjacent the orifices, the printhead comprising:

an upper substrate having first and second parallel surfaces and two opposing, parallel edge faces that are perpendicular to the substrate surfaces, the first surface containing a depression and a plurality of parallel straight grooves, one end of the grooves perpendicularly penetrating one upper substrate face and the other ends of the grooves opening into the depression;

a lower substrate having first and second parallel surfaces and an edge face perpendicular to the lower substrate surfaces, a plurality of heating elements having surfaces with predetermined areas and being formed in a row on the lower substrate first surface parallel with and a predetermined distance from the lower substrate face, together with respective electrodes for selectively addressing the heating elements with said electrical input signals, the addressing electrodes having terminal ends at the edges of the lower substrate first surface other than the one adjacent its edge face;

a passivation layer covering the lower substrate first surface, including said addressing electrodes, but excluding the heating element surfaces and the terminal ends of the addressing electrodes, these having been cleared of the passivation layer;

a thick film insulative layer having a predetermined thickness overlaying only the passivation layer, so that the thickness of the thick film layer provides substantially perpendicular walls that individually surround each of the heating elements, thus placing each heating element surface at the bottom of a recess produced by said thick film walls;

said upper and lower substrate being aligned and bonded together to form the printhead with their respective first surfaces being confrontingly joined and with the upper substrate face having the groove penetrations being coplanar with the lower substrate face, so that the upper substrate depression and grooves respectively become the ink reservoir and the ink channels, the groove penetrations in the upper substrate face become the orifices, the alignment of the upper and lower substrates places one recessed heating element in each channel a predetermined distance from an associated orifice, so that the thick film walls inhibit the growth of the vapor bubbles in a direction parallel with the ink flow path in said channels while promoting bubble growth in a direction normal to the heating elements, whereby the heating element recess in said thick film layer enables closer placement of the heating elements to the orifices and the consequent ejection of higher velocity droplet and yet prevents vaporized ink blowout during said droplet ejecting bubble generation;

means for connecting the printhead reservoir to a source of ink under a predetermined pressure external to the printhead; and means for addressing the electrode terminal ends with said input signals.

2. The ink jet printhead of claim 1, wherein the thick film layer has a uniform thickness in the range of 10 to 100 microns to produce said recesses having a depth of this range; wherein the thick film layer is Riston ®; and wherein the recessed heating elements are located about 2 to 3 mils or 50 to 75 microns upstream from said orifices.

3. An improved thermal ink jet recording apparatus for ejecting and propelling ink droplets on demand along a flight path toward a recording medium spaced therefrom in response to electrical input signals representing digitized data signals applied thereto, comprising;

at least one elongated, straight channel defining a straight ink flow path therethrough with substantially uniform cross-sectional area and having an orifice on one end substantially perpendicular to the ink flow path, the other end serving as an inlet in communication with an ink reservoir;

means for filling and maintaining the reservoir and channel with ink having a predetermined pressure, the channel and orifice being of substantially equal cross-sectional area and dimensioned to cause a meniscus to be formed at the orifice that has a surface tension which prevents ink from weeping therefrom;

a heating element being located internally of the channel and having a surface with a predetermined surface area contacting the ink, the surface of the heating element being perpendicular to the ink flow path in the channel, the heating element surface being positioned at the bottom of a recess having a uniform depth in the range of 10 to 100 microns in a surface portion of the channel, said recess having walls that closely surround the heating element and that are substantially perpendicular thereto, said recess being positioned closely adjacent and upstream of said orifice for a distance of about 2 to 3 mils or 50 to 75 microns;

means for applying current pulses to the heating element in said recess in response to the input signals, the pulses each having sufficient amplitude and duration to vaporize momentarily the ink contacting the heating element surface substantially instantaneously to form a temporary vapor bubble which causes the expulsion of a discrete droplet of ink from said orifice in a direction in substantial alignment with the ink flow path in said straight channel and propels it towards the recording medium, the walls of the recess containing the heating element inhibiting the growth of the bubble in a direction parallel to said ink flow path and said surface of the heating element, while promoting bubble growth in a direction normal to the surface of the heating element, and thus enabling closer location of the heating element to the orifice and the consequent ejection of higher velocity droplets while preventing a release of vaporized ink from the bubble during the droplet expulsion with a consequent ingestion of air, so that the operational efficiency of the printhead is improved; and the ink from the reservoir replenishing the ink in the channel by capillary action each time a droplet is expelled.

* * * * *